(12) United States Patent
Seo

(10) Patent No.: US 7,690,819 B2
(45) Date of Patent: Apr. 6, 2010

(54) EXTERNAL LIGHT SHIELDING FILM AND DISPLAY FILTER HAVING THE SAME

(75) Inventor: Jin Seo, Suwon-si (KR)

(73) Assignee: Samsung Corning Precision Glass Co., Ltd., Gumi (KR)

( * ) Notice: Subject to any disclaimer, the term of this patent is extended or adjusted under 35 U.S.C. 154(b) by 249 days.

(21) Appl. No.: 11/859,891

(22) Filed: Sep. 24, 2007

(65) Prior Publication Data

US 2008/0080191 A1     Apr. 3, 2008

(30) Foreign Application Priority Data

Sep. 29, 2006     (KR) .................. 10-2006-0096292

(51) Int. Cl.
*F21V 9/00* (2006.01)
*F21V 5/00* (2006.01)

(52) U.S. Cl. .................. 362/326; 362/293; 313/112

(58) Field of Classification Search ............... 362/326, 362/317, 330, 293; 313/112, 110, 489, 311, 313/582, 479

See application file for complete search history.

(56) References Cited

U.S. PATENT DOCUMENTS

| | | | | |
|---|---|---|---|---|
| 7,456,557 B2 * | 11/2008 | Park et al. | .................. | 313/112 |
| 2005/0253493 A1 * | 11/2005 | Park et al. | .................. | 313/110 |
| 2006/0250064 A1 * | 11/2006 | Park et al. | .................. | 313/112 |
| 2006/0285214 A1 * | 12/2006 | Haga et al. | .................. | 359/619 |
| 2007/0152555 A1 * | 7/2007 | Park et al. | .................. | 313/112 |

* cited by examiner

*Primary Examiner*—Bao Q Truong
(74) *Attorney, Agent, or Firm*—Stein McEwen, LLP

(57) ABSTRACT

An external light shielding film including a lens pattern formed on a surface of a base substrate and including a plurality of aspheric lenses, and an external light shielding pattern formed on another surface of the base substrate, and a display filter having the same, are provided. The external light shielding film and the display filter having the same may increase a contrast ratio in a bright room, enhance brightness, and increase a viewing angle.

8 Claims, 5 Drawing Sheets

EXTERNAL LIGHT SHIELDING FILM AND DISPLAY FILTER HAVING THE SAME

CROSS-REFERENCE TO RELATED APPLICATION

This application claims the benefit of Korean Patent Application No. 10-2006-0096292, filed on Sep. 29, 2006, in the Korean Intellectual Property Office, the entire disclosure of which is incorporated herein by reference.

BACKGROUND OF THE INVENTION

1. Field of the Invention

The present invention relates to an external light shielding film and a display filter having the same, and more particularly, to an external light shielding film and a display filter having the same which can increase a contrast ratio in a bright room, enhance brightness, and increasing a viewing angle.

2. Description of Related Art

Plasma display panel (PDP) apparatuses are generally gaining popularity as next-generation display apparatuses to simultaneously satisfy a trend of becoming larger, and of becoming thinner, when compared with cathode-ray tubes (CRTs) typical of existing display apparatuses. The PDP apparatuses display images using a gas discharge phenomenon, and exhibit superior display characteristics such as display resolution, brightness, contrast ratio, an afterimage, a viewing angle, and the like. Also, since the PDP apparatuses are generally seen as having the most appropriate characteristics for future high-quality digital televisions due to thin luminous display apparatuses of which enlargement is simpler than any other display apparatus, the PDP apparatuses are gaining popularity as display apparatuses and are replacing CRTs.

The PDP apparatus generates a gas discharge between electrodes by a direct current (DC) voltage or an alternating current (AC) voltage which are supplied to the electrodes. Here, ultraviolet light is generated. Then, a phosphor is excited by ultraviolet light, thereby emitting light.

However, the PDP apparatus has a defect in that an amount of emitted electromagnetic (EM) radiation and near infrared (NI) radiation with respect to a driving characteristic is great, surface reflectivity of the phosphor is great, and color purity is lower than the CRT due to orange light emitted from helium (He), or xenon (Xe) used as a sealing gas.

Also, EM radiation and NI radiation generated in the PDP apparatus may have harmful effects on human bodies, and cause sensitive equipment such as wireless telephones, remote controls, and the like, to malfunction. Therefore, in order to use the PDP apparatus, it is required to prevent emission of EM radiation and NI radiation emitted from the PDP apparatus from increasing to more than a predetermined level. PDP filters having functions such as an EM radiation-shielding function, an NI radiation-shielding function, a surface antiglare function, enhancement of color purity, and the like, are used for EM radiation-shielding and NI radiation-shielding while simultaneously reducing reflected light, and enhancing color purity.

The PDP apparatus is made of a panel assembly including a discharge space where a gas discharge phenomenon occurs, and a PDP filter for EM radiation-shielding and NI radiation-shielding. Since the PDP filter is equipped in a front unit of the panel assembly, transparency is required to simultaneously emit light and perform shielding functions.

External light may enter the panel assembly passing through the PDP filter in a condition that an outer surface is bright, that is, in a bright room condition with the PDP apparatus according to the conventional art. Accordingly, an overlapping between incident light generated in the discharge space of the panel assembly, and the external light entered passing through the PDP filter from the outer surface occurs. Accordingly, a contrast ratio decreases in the bright room condition, and therefore screen display capacity of the PDP apparatus is deteriorated.

Also, in the case where a separate light absorption pattern for absorbing external light to increase a contrast ratio is used, brightness of the PDP apparatus is deteriorated, and viewing angle of the PDP apparatus is reduced.

SUMMARY OF THE INVENTION

An aspect of the present invention provides to an external light shielding film and a display filter having the same which can increase a contrast ratio in a bright room, enhance brightness, and increase a viewing angle.

Another aspect of the present invention provides an external light shielding film and a display filter having the same which can effectively select and absorb only external light and simultaneously improve a viewing angle.

According to an aspect of the present invention, there is provided an external light shielding film including a lens pattern formed on a surface of a base substrate and including a plurality of aspheric lenses; and an external light shielding pattern formed on another surface of the base substrate.

According to another aspect of the present invention, there is provided a display filter including at least one external light shielding film formed between two successive layers of the display filter. In this instance, the external light shielding film includes a lens pattern formed on a surface of a base substrate and including a plurality of aspheric lenses, and an external light shielding pattern formed on another surface of the base substrate.

BRIEF DESCRIPTION OF THE DRAWINGS

The above and other aspects of the present invention will become apparent and more readily appreciated from the following detailed description of certain exemplary embodiments of the invention, taken in conjunction with the accompanying drawings of which.

DETAILED DESCRIPTION OF EXEMPLARY EMBODIMENTS

Figure 1:
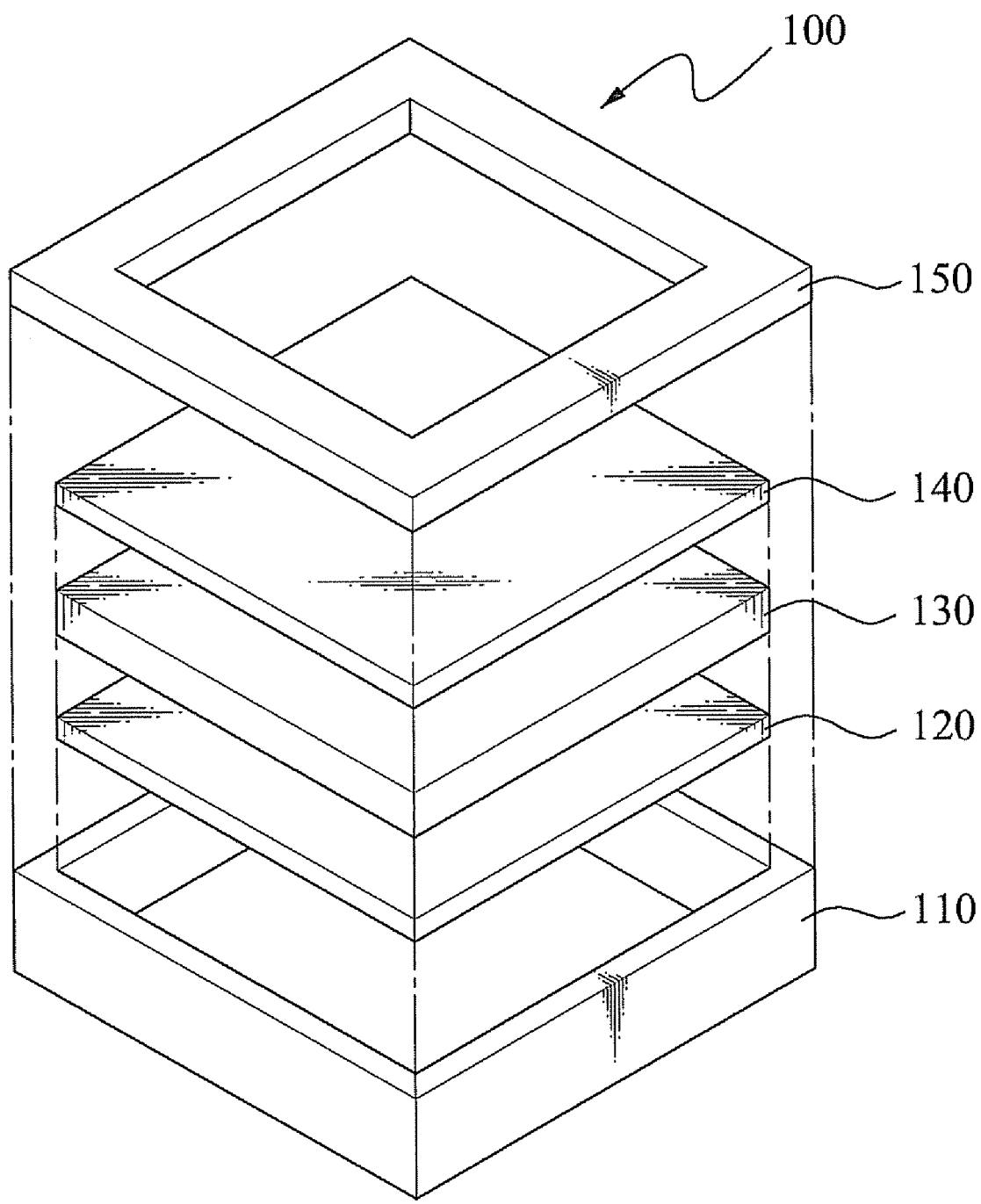
FIG. 1 is an exploded perspective view illustrating a PDP apparatus according to an exemplary embodiment of the present invention.

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

Terminologies such as technical terms, which will be hereinafter used in throughout the present specification, may be used in a manner well understood to those skilled in the art. Also, the terminologies defined in general dictionaries should not be ideally or overly interpreted as long as they are not obviously defined.

An external light shielding film according to an exemplary embodiment of the present invention may be diversely applied to large-sized display apparatuses such as plasma display panel (PDP) apparatuses having pixels formed in a lattice pattern to express red color, green color and blue color (RGB), organic light emitting diode (OLED) apparatuses, liquid crystal display (LCD) apparatuses, field emission display (FED) apparatuses, and the like; and small-size mobile display apparatuses such as personal digital assistants (PDP), display windows of small-sized games, display windows of mobile phones, and the like; and flexible display apparatuses. In particular, the external light shielding film according to the present invention may be effectively applied to a display apparatus for outdoor use where external light is relatively strong, and a display apparatus installed in indoor public facilities. For convenience of description, exemplary embodiments of the present invention will be described hereinafter by using a PDP apparatus and a PDP filter for the PDP apparatus, but the embodiments are not limited thereto. The present invention may be applied to various kinds of display apparatuses and the filters for the display apparatus as described above.

The external light shielding film according to the present invention includes a lens pattern formed on a surface of a base substrate and including a plurality of aspheric lenses, and an external light shielding pattern formed on another surface of the base substrate. Also, a display filter according to the present invention includes at least one above-mentioned external light shielding film.

Hereinafter, exemplary embodiments of the invention will be described in detail with reference to FIGS. 1 to 4.

Figure 2:
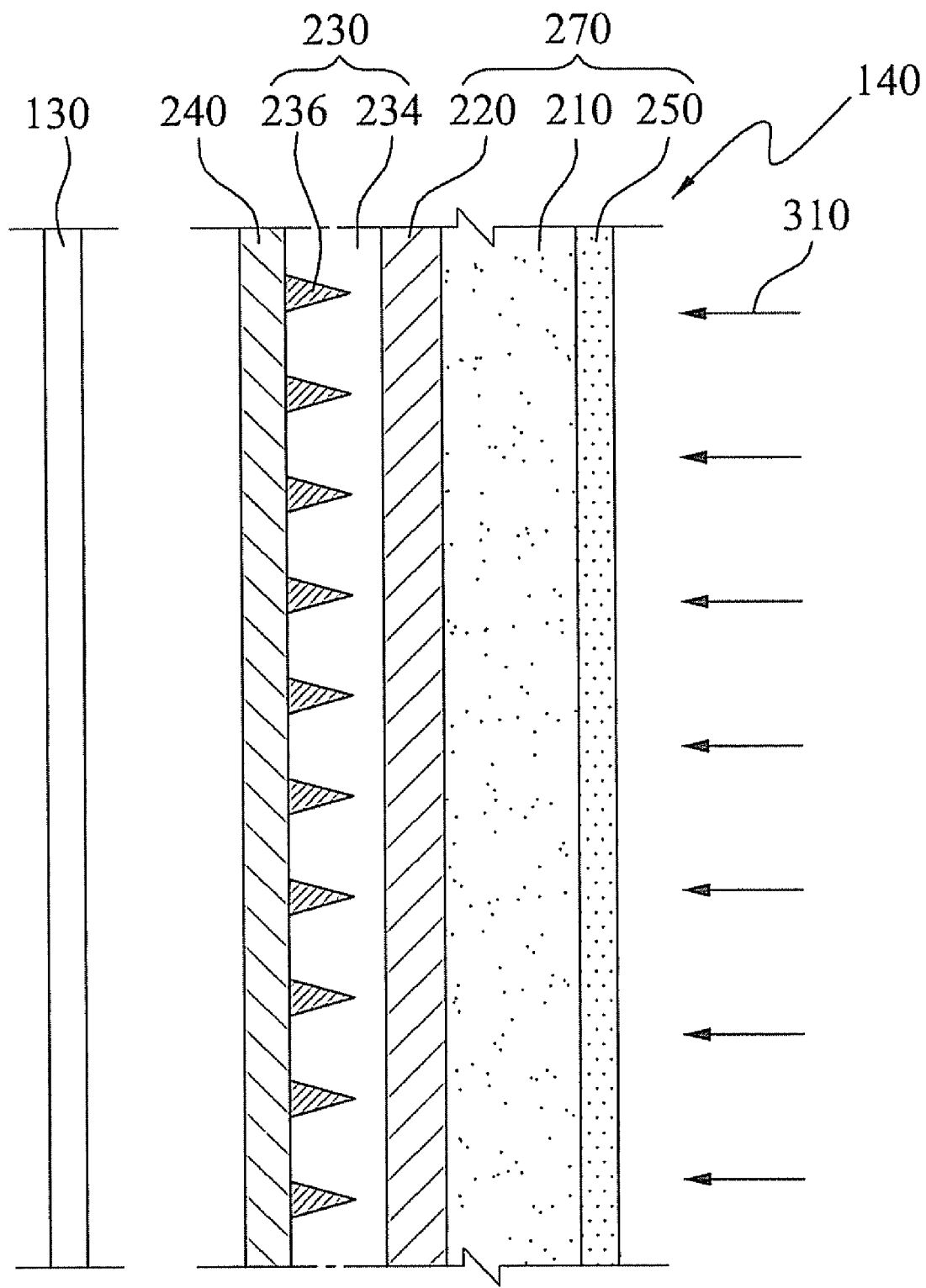
FIG. 2 is a cross-sectional view illustrating a PDP filter according to an exemplary embodiment of the present invention.
Figure 3:
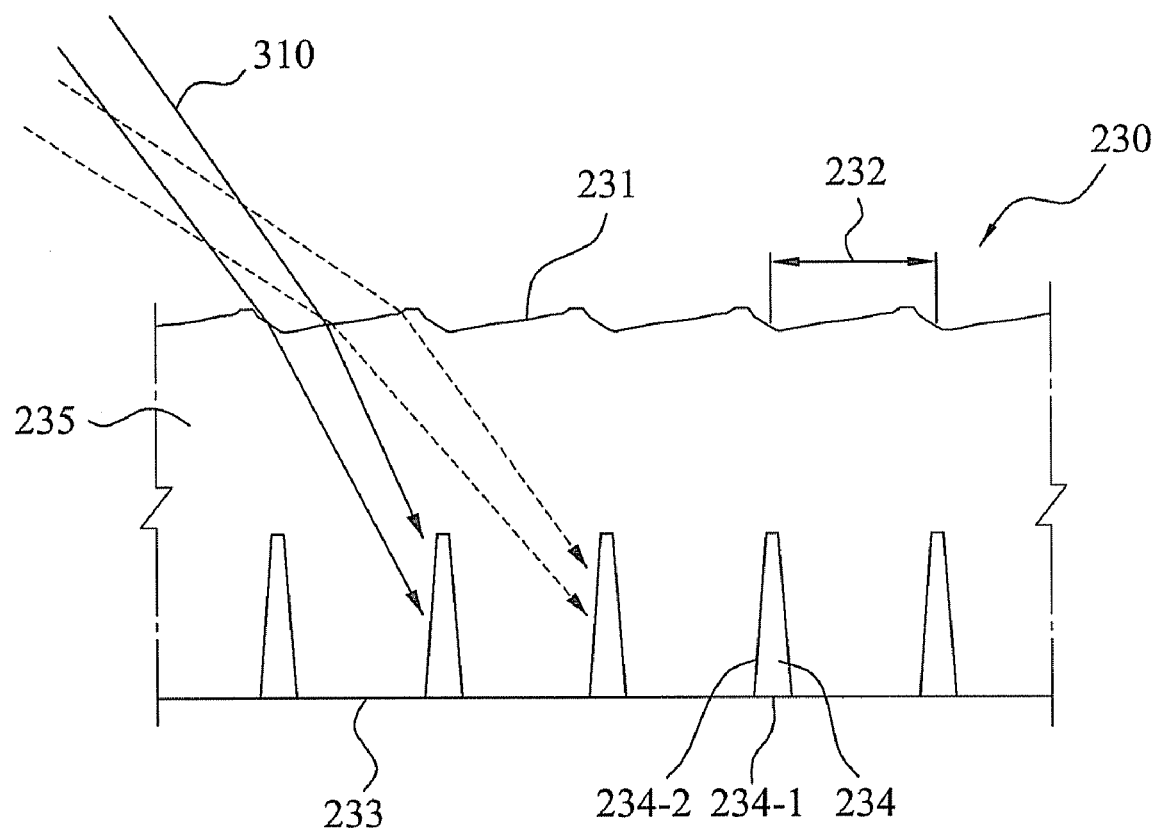
FIGS. 3 and 4 are cross-sectional views illustrating an external light shielding film according to an exemplary embodiment of the present invention.
Figure 4:
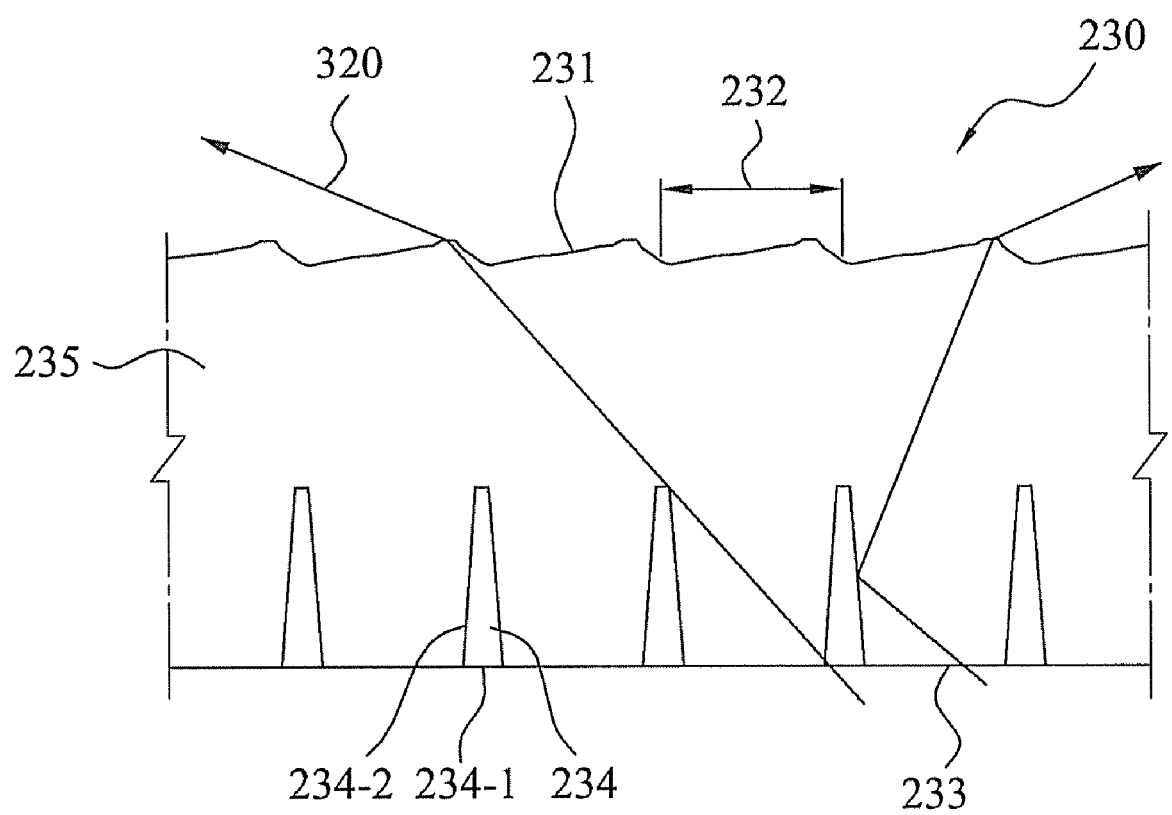

FIG. 1 is an exploded perspective view illustrating a PDP apparatus according to an exemplary embodiment of the present invention. FIG. 2 is a cross-sectional view illustrating the PDP filter of FIG. 1. FIG. 3 is a magnified cross-sectional view illustrating an external light-shielding film of FIG. 2. FIG. 4 is a magnified cross-sectional view illustrating the external light shielding film of FIG. 2.

As illustrated in FIG. 1, a PDP apparatus 100 according to the present exemplary embodiment of the invention includes a case 110, a cover 150 for covering an upper portion of the case 110, a driving circuit board 120 received in the case 110, a panel assembly 130 including discharge cells where a gas discharge phenomenon occurs, and a PDP filter 140. The PDP filter 140 includes a conductive layer including a material with high conductivity on a transparent substrate, and the conductive layer is grounded to the case 110 via the cover 150. Specifically, electromagnetic (EM) radiation generated from the panel assembly 130 is shielded by the cover 150 and the case 110 which are grounded using the conductive layer of the PDP filter 140, before reaching a viewer.

First, the PDP filter 140 for shielding EM radiation, near infrared ray, external light, and the like, will be described in detail.

As illustrated in FIG. 2, the PDP filter 200 according to the present exemplary embodiment includes a filter base 270 and an external light-shielding film 230. The filter base 270 includes a transparent substrate 210, and layers which have various shielding functions, and the like, and are formed on the transparent substrate 210.

Here, the filter base 270 is formed by stacking the transparent substrate 210, an EM radiation-shielding layer 220, or an antireflective layer 250 regardless of order. Hereinafter, layers corresponding to an EM radiation-shielding function, and an antireflection function are described as separate layers in the present exemplary embodiment, but the present invention is not limited thereto. Specifically, the filter base 270 according to the present exemplary embodiment may include at least one layer, and each layer may have at least one function from the group consisting of the EM radiation-shielding function, and the antireflection function. Also, the filter base 270 may either collectively have the EM radiation-shielding function and the antireflection function, or have merely one function of the EM radiation-shielding function, and the antireflection function.

The external light-shielding film 230 is disposed on a surface of the filter base 270. The external light-shielding film 230 of FIG. 2 is disposed on a surface facing towards the panel assembly 130 of the filter base 270, that is, an opposite surface of a viewer position when the PDP filter 200 is installed in the PDP apparatus, but the present invention is not limited thereto, and the external light-shielding film 230 may be disposed on another surface of the filter base 270.

The external light-shielding film 230 includes a lens pattern 231 formed on a surface of a base substrate 235 and including a plurality of aspheric lenses 232, and an external light-shielding pattern 233 formed on another surface of the base substrate 235. Also, the external light-shielding pattern 233 includes a plurality of external light-shielding parts 234 for shielding external light entering into the panel assembly 130 from the outside.

Here, the base substrate 235 where the external light-shielding part 234 is formed may be directly formed in the filter base 270, and the base substrate 235 may be combined with the filter base 270 after forming the base substrate 235 on a supporter formed on the filter base 270, as necessary. Specifically, since the supporter has a purpose of supporting the base substrate 235, the base substrate 235 and the filter base 270 may be directly combined when the external light-shielding film 230 is disposed on another surface of the filter base 270.

The base substrate 235 may be made of an ultraviolet light-curable resin, and each of the plurality of external light-shielding parts 234 may be made of external light-absorbing materials such as black organic/inorganic materials and a metal which are capable of absorbing light. In this instance, the plurality of external light-shielding parts 234 are formed in parallel on the surface of the base substrate 235 facing the panel assembly 130 and function to prevent external light 310 from entering into the panel assembly 130.

Hereinafter, the external light-shielding film 230 according to the present exemplary embodiment of the invention will be described in detail with reference to FIGS. 3 and 4.

As illustrated in FIG. 3, the external light-shielding film 230 includes the lens pattern 231 formed on a surface of the base substrate 235 and including the plurality of aspheric lenses 232, and an external light-shielding pattern 233 formed on another surface of the base substrate 235.

The lens pattern 231 functions to increase an absorption rate of the external light 310, thereby serving as a spherical aberration compensation lens or a saddle compensation lens.

An aspheric surface (Z) of each of the plurality of aspheric lenses 232 according to the present exemplary embodiment of the invention is preferably obtained by $$z(r) = \frac{Cr^2}{1+\sqrt{1-(1+k)C^2r^2}} + Ar^4 + Br^6 + Cr^8 + Dr^{10}.$$

In this instance, 'r' denotes a radius of a spherical surface, 'C' denotes a spherical coefficient, 'k' denotes a conic constant, and 'A', 'B', 'C', and 'D' denote an integer of 2 through 7, respectively.

Also, a ratio of a number of the plurality of aspheric lenses 232 to a number of the plurality of external light shielding parts 234 is preferably about 1:1 through about 1:4.

Here, a diameter of the aspheric lens 232 varies according to a refractive index of the aspheric lens 232 or an interval between the plurality of the external light-shielding parts 234. In general, the diameter of the aspheric lens 232 is preferably about 50 to 100 μm.

Also, the number of the plurality of aspheric lenses 232 may vary according to an incident angle of the external light 310 entering into the lens pattern.

Also, the interval between the plurality of the external light-shielding parts 234 may vary according to the number of the plurality of aspheric lenses 232.

The external light-shielding pattern 233 is formed on a surface of the base substrate 235 which has the lens pattern 231 of the external light-shielding film 230 formed on another surface thereof, and includes the plurality of external light-shielding parts 234.

Here, each of the plurality of external light-shielding parts 234 includes a bottom surface 234-1 exposed to the outside of the base substrate 235, and an inclined surface 234-2 defining a groove formed into the base substrate 235 from the bottom surface 234-1. The inclined surface functions to absorb the external light 310 or totally reflect incident light from the panel assembly 130 to a viewer side.

In this instance, each length of the bottom surface 234-1 and the inclined surface 234-2 of the external light-shielding parts 234 may be appropriately adjusted, as necessary. Preferably, the length of the inclined surface 234-2 is relatively longer than that of the bottom surface 234-1. Also, a cross-sectional area of each external light-shielding part 234 may be appropriately formed into any one of a wedge shape, a trapezoidal shape, and the like, as necessary.

The external light-shielding part 234 may be made of a material which is capable of absorbing the external light 310 and totally reflecting an incident light from the panel assembly 130. However, types of the material are not limited as long as the material satisfies the above-mentioned properties. As the examples of the material, a black inorganic material, a black organic material, and a metal may be used. In particular, in the case where a metal powder having relatively higher conductivity and relatively lower electric resistance is used for the external light-shielding parts 234, the electric resistance can be adjusted according to a concentration of the metal powder, and thus the external light-shielding parts 234 can shield electromagnetic waves. Also, in the case where a black metal or a metal with a blackened outer surface is used for the external light-shielding parts 234, the external light-shielding parts 234 can effectively shield the external light and electromagnetic waves. In addition, an ultraviolet light-curable resin containing carbon may be used for the external light-shielding part 234.

The external light-shielding part 234 may be formed by a heat press method of using a thermoplastic resin, and an injection formation method in which a thermoplastic or thermo-curable resin is filled into the base substrate 235 on which an opposite shape to the light-shielding part 234 is reflected, and the like. Also, when the ultraviolet light-curable resin forming the base substrate 235 has the antireflection function, the EM radiation-shielding function, a color calibration function, or any combination thereof, the external light-shielding film 230 may additionally perform the above functions.

As illustrated in FIG. 4, an internal incident light 320 emitted from the panel assembly 130 is totally reflected to the external light-shielding part 234, thereby increasing a contrast ratio in a bright room.

Also, a color correction film 240 may be stacked on an upper portion of the external light-shielding film 230 formed on the filter base 270, as necessary. Various kinds of coloring capable of increasing color gamut of a display and improving image resolution may be used for the color correction film 240. Dyes or pigments may be used for the coloring agent. As the examples of the coloring agent, an organic coloring agent having neon light-shielding function, such as anthraquinone, cyanine, azo, stilbene, phthalocyanine, methane, and the like, may be used, and the present invention is not limited thereto. Since kinds and concentrations of the coloring agents are determined by absorption wavelength, absorption coefficients, and transmittance characteristics required for displays, various numerical values may be used without being limited to a specific value.

When each layer or each film of the PDP filter according to the present exemplary embodiment of the invention is stuck together, a transparent gluing agent or adhesive may be used. Examples of the agents may include an acrylic adhesive, a silicon adhesive, an urethane adhesive, a polyvinyl butyral adhesive (PMB), an ethylene-vinyl acetate adhesive (EVA), a polyvinyl ether, a saturated amorphous polyester, a melamine resin, and the like.

In general, when viewing a display in a bright room, an incident angle of the external light 310 on an outer surface of a viewer side of a display is about 40 to 60 degrees. Specifically, incident angles of the external light 310 are refracted by the aspheric lens 232 of the lens pattern 231, and thus the external light shielding part 234 may absorb nearly all of the external light 310 incident on the external light-shielding part 234, even when the incident angles, as illustrated in FIG. 3, are different from one another. As a result, light convergence can be improved within a certain incident angle of the external light 310 incident on the outer surface of the viewer side of the display, and a contrast ratio in a bright room can be increased by reducing external light diffused and reflected inside the display.

Figure 5:
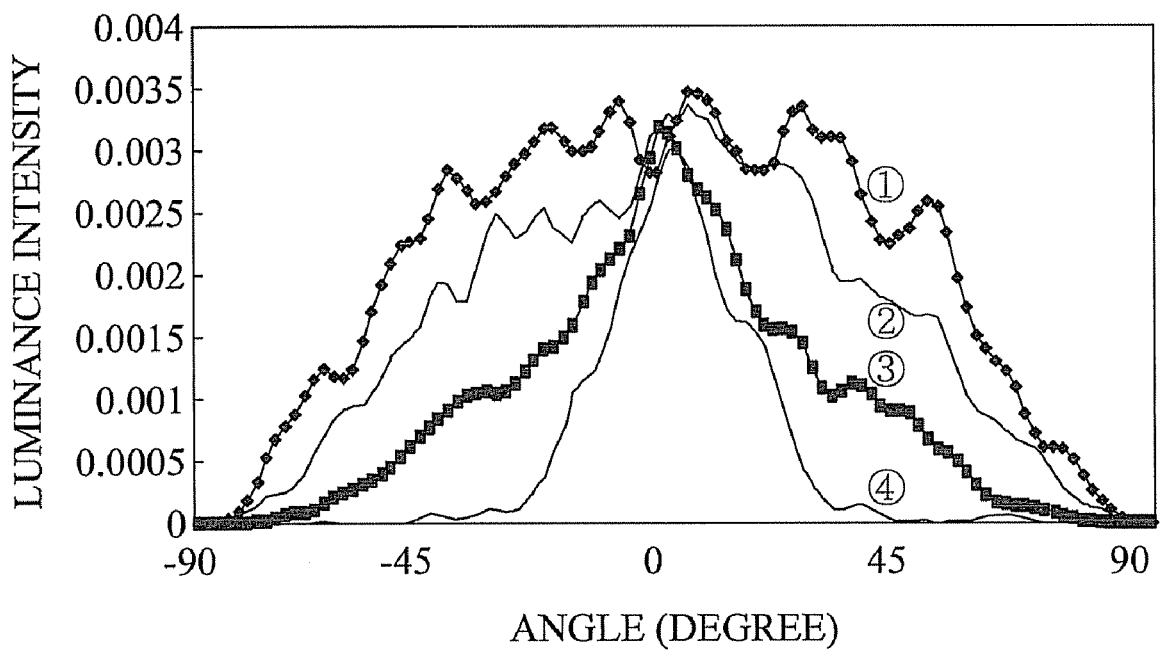
FIG. 5 is graph illustrating measurement results obtained by measuring respective contrast ratios between external light-shielding films according to exemplary embodiments of the present invention and general films.

FIG. 5 is a graph illustrating measurement results obtained by measuring respective contrast ratios between an external light-shielding film ① including a lens pattern formed on a surface of a horizontal base substrate and having a plurality of aspheric lenses, and external light shielding parts formed on another surface of the base substrate, and a general film ②, also between an external light-shielding film ③ including a lens pattern formed on a surface of a vertical base substrate and having a plurality of aspheric lenses, and external light shielding parts formed on another surface of the base substrate, and a general film ④. As can be seen in the results, the external light-shielding film ① according to the present invention exhibits relatively superior contrast ratio in various angles in comparison with other films.

As described above, according to the present invention, the external light shielding film and the display filter having the same may increase a contrast ratio in a bright room, enhance brightness, and increase a viewing angle. Also, the external light shielding film and the display filter having the same may effectively select and absorb only external light and simultaneously improve a viewing angle.

Although, a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An external light shielding film comprising:
    a lens pattern formed on a surface of a base substrate and including a plurality of aspheric lenses; and
    an external light shielding pattern formed on another surface of the base substrate,
    wherein an aspheric surface (Z) of each of the plurality of aspheric lenses is obtained by $$z(r) = \frac{Cr^2}{1 + \sqrt{1 - (1+k)C^2 r^2}} + Ar^4 + Br^6 + Cr^8 + Dr^{10},$$

where 'r' denotes a radius of a spherical surface, 'C' denotes a spherical coefficient, 'k' denotes a conic constant, and 'A', 'B', 'C', and 'D' denote an integer of 2 through 7, respectively.

2. The external light shielding film of claim 1, wherein the external light shielding pattern includes a plurality of external light shielding parts.

3. The external light shielding film of claim 2, wherein a ratio of a number of the plurality of aspheric lenses to a number of the plurality of external light shielding parts is about 1:1 through about 1:4.

4. The external light shielding film of claim 2, wherein each of the plurality of external light shielding parts is formed of an inclined surface defining a groove formed into the base substrate from a bottom surface of the base substrate, and a cross-sectional area of each of the plurality of light shielding parts is formed into any one of a wedge shape and a trapezoidal shape.

5. The external light shielding film of claim 2, wherein each of the plurality of external light shielding parts includes at least one material selected from the group consisting of a black inorganic material, a black organic material, and a metal.

6. The external light shielding film of claim 1, wherein an external light entering into the lens pattern has an incident angle of about 40 through about 60 degrees.

7. A display filter, comprising:
    at least one external light shielding film formed between two successive layers of the display filter, the external light shielding film including a lens pattern formed on a surface of a base substrate and including a plurality of aspheric lenses, and an external light shielding pattern formed on another surface of the base substrate, wherein an aspheric surface (Z) of each of the plurality of aspheric lenses is obtained by $$z(r) = \frac{Cr^2}{1 + \sqrt{1 - (1+k)C^2 r^2}} + Ar^4 + Br^6 + Cr^8 + Dr^{10},$$

where 'r' denotes a radius of a spherical surface, 'C' denotes a spherical coefficient, 'k' denotes a conic constant, and 'A', 'B', 'C', and 'D' denote an integer of 2 through 7, respectively.

8. The display filter of claim 7, further comprising an anti-reflection film, wherein the external light shielding pattern is formed on a surface of the base substrate to face a direction opposite to the anti-reflection film.

* * * * *